United States Patent [19]
Schischkow

[11] 3,800,532
[45] Apr. 2, 1974

[54] EXHAUST PURIFIER AND METHOD
[76] Inventor: Konstantin F. Schischkow, 154-41 9th Ave., Whitestone, N.Y. 11357
[22] Filed: Feb. 8, 1973
[21] Appl. No.: 330,594

[52] U.S. Cl.............. 60/274, 23/288 F, 60/295, 60/299, 423/212
[51] Int. Cl............................................ F01n 3/14
[58] Field of Search............ 60/274, 295, 299; 23/288 F; 423/212

[56] References Cited
UNITED STATES PATENTS
2,071,119  2/1937  Harger ............................. 60/295
R25,858   9/1965  Matvay ............................. 60/295
3,224,188 12/1965  Barlow ............................. 60/295

FOREIGN PATENTS OR APPLICATIONS
942,055  11/1963  Great Britain ..................... 60/295

Primary Examiner—Douglas Hart
Attorney, Agent, or Firm—Albert F. Kronman

[57] ABSTRACT

Catalysts in the form of very fine powder are broken from large particles of catalytic material and directed into the exhaust manifold of internal combustion engines at the region of highest temperature to purify the products of combustion.

11 Claims, 2 Drawing Figures

EXHAUST PURIFIER AND METHOD

BACKGROUND OF THE INVENTION

It is well-known to introduce catalytic material into the exhaust manifold of internal combustion engines for the purpose of reducing the toxicity of exhaust gases. Such prior art devices, however, are highly complicated and require heating elements to bring the catalytic materials up to the desired operating temperature, metering valves to insure that the proper amount of catalyst is fed into the manifold at each speed of the engine, and in some cases a series of baffles, vanes and other apparatus.

Other prior art devices direct catalysts into the engine cylinders or provide chambers within the engine muffler to receive catalytic material for mixture with the products of combustion.

It is an object of the present invention to provide a highly simplified exhaust purifier for internal combustion engines.

Another object of the present invention is to provide an exhaust purifier for internal combustion engines which can readily be attached to existing engines without major structural changes.

A further object of the present invention is to provide an exhaust purifier which can be serviced by relatively unskilled persons.

SUMMARY OF THE DISCLOSURE

In one preferred embodiment of the present invention a container is secured directly to the outside of an internal combustion engine in such manner that vibration of the engine will shake the container. A quantity of catalytic material in the form of discrete particles is placed within the container. A tube is led from the interior of the container into the engine exhaust manifold at the region of maximum temperature. The vibration of the container causes the catalytic material to form a fine dust which is pulled into the exhaust manifold through the tube by the pulsing pressures set up in the exhaust manifold by the operation of the engine.

DESCRIPTION OF THE DRAWING

In the accompanying drawing forming part hereof identical parts have been given the same reference numerals in which drawings.

GENERAL DESCRIPTION

Figure 1:
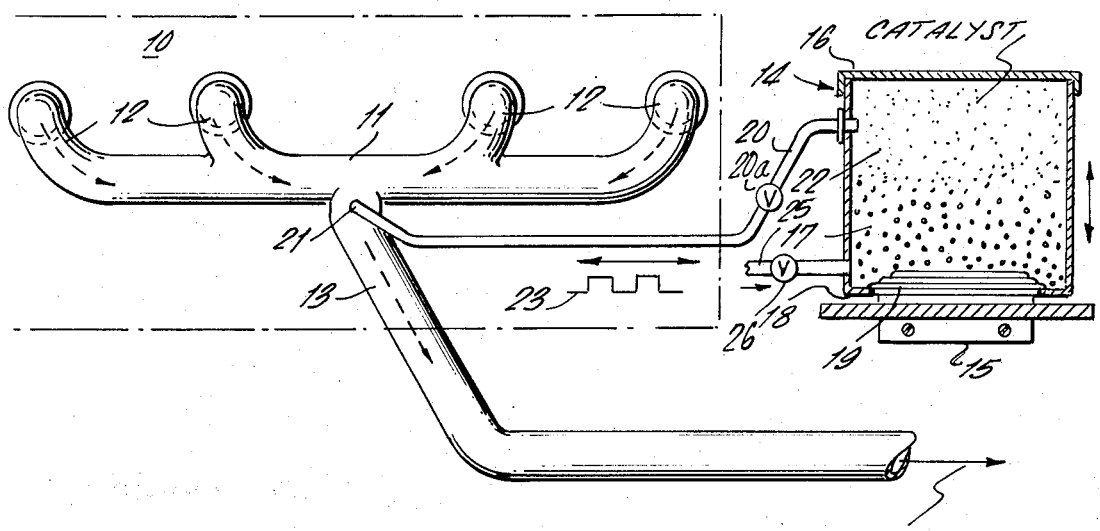
FIG. 1 is a view in side elevation, partly cut away, of a portion of an internal combustion engine with an exhaust purifier made in accordance with the present invention attached thereto.

Referring to the drawing, and particularly to FIG. 1, the reference numeral 10 indicates an internal combustion engine such as a gasoline or diesel engine. An exhaust manifold 11 is provided with branches 12 to receive the products of combustion from each of the cylinders. A central conduit 13 on the exhaust manifold directs all of the products of combustion from the exhaust manifold into a muffler (not shown) following which they are discharged into the atmosphere.

A container 14, made of metal or any other material which will withstand high temperatures is secured directly to the internal combustion engine by a bracket 15. Since most internal combustion engines, such as automobile engines are supported by flexible mounts substantial vibration will be imparted to the container during the operation of the engine.

The container is provided with a cover 16 for easy access to its interior. A quantity of catalytic material 17 may thus be placed within the container 14 and replaced as needed during the regular servicing of the engine. The bottom 18 of the container 14 may include a thin diaphragm 19 to aid in agitating the catalytic material and thereby promote abrasion of the said catalytic material to produce dust-sized particles of catalyst.

A thin tube 20 of metal or some other high temperature resistant material, is led from the interior of the container 14 to the interior of the central conduit 13 on the exhaust manifold 11. The tube 20 is connected to the central conduit where the said conduit joins the exhaust manifold as indicated at 21 in FIG. 1. In this manner catalytic material in the form of dust 22 coming from the container 14 through the tube 20 will mix with the products of combustion at the highest temperature which is easily available in the manifold 11. The high temperatures are extremely important for good catalytic action in most of the well-known catalysts. In addition the problem of good exhaust purification when the engine is cold is overcome without the need for auxiliary sources of heat.

It has been found that the pulsing pressures set up in the exhaust manifold of internal combustion engines, indicated by the square wave 23 in FIG. 1, are sufficient to draw the dust-like catalyst particles 22 from the container 14 into the central conduit 13 without need for special pumps, metering valves or the like. In order to prevent oil, tar and other products of combustion from being forced into the tube 20 a small flap valve 20a is placed in the tube 20 between the container 14 and the central conduit 13. Catalyst particles are thus kept in a dry, dust-like condition.

To aid in driving the small catalyst particles 22 to the top of the container 14 where they can be drawn into the tube 20, a second tube 25 is led into the container 14 near the bottom thereof. The tube 25 is attached to a source of gas under pressure, which may be the conduit 13 down stream of the tube connection at 21. A valve 26 is placed in the tube 25 to regulate the flow of gas entering the container 14 and prevent contamination of the catalytic particles.

Since a cold engine or one which is not firing properly vibrates more than a warm engine or a properly functioning engine, a greater amount of catalyst abrasion takes place and more catalytic dust is produced and sucked into the conduit 13. The rough action of an engine which coincides with an increase in the production of pollutants thus automatically increases the amount of catalyst being mixed with the products of combustion.

The specific chemical nature of the catalytic material employed in the present invention will vary depending upon the pollutants which are to be suppressed. Well-known catalytic materials may be used providing they are dry, particulate and will abrade into a fine dust. In some instances it may be desireable to form ceramic particles containing the catalytic material to control the rate of dusting. Catalytic particles in the form of a very fine dust are suitable for the present invention. In the well-known automobile engine using leaded fuel, the catalyst may be selected from a wide selection of available active catalysts as for example:

A composite of mangano-chromia-manganite catalyst having a Mn-Cr ratio of 3:0.5 to 3:1.5 which oxidizes carbon dioxide mixed with mangano-chromia-manganite catalyst having a Mn—Cr ratio of 3:3.5 to 3:30 which oxidized hydrocarbon is particularly suitable. Oxides of multivalent metals, such as iron, chromium, copper cobalt, manganese, molybdenum, nickel platinum and palladium are also effective. These may be coated on base particles of pure silica or pure alumina to dust off an abrasion.

Another preferred catalyst is 9% ferric oxide promoted with 4% of chromium oxide and 3% copper oxide. Many of the catalysts falling within the above enumeration are commercially available. Among these are "Celite 408" (Johns Manville Co. ) which consists of 12% ferric oxide, 6% chromium oxide and 3% copper oxide, and Gridler G43 catalyst sold by the Catalyst Division of Chemetron Corporation, Louisville, Kentucky, which consists of 0.1% platinum, 3% nickel, balance alumina.

Also effective are water gas shift reaction catalysts containing about 8% chromium oxide, 92% ferric oxide and town gas catalysts containing 20–30% nickel on alumina promoted with a small amount of alkali or alkaline, earth metal oxides.

Similarly, zealites designated type A, X,and Y by the Linde Division of Union Carbide will give satisfactory results.

The precise amount of catalyst to be used will vary with the composition of the fuels to be used, the h.p. of the engine and its precise type, internal combustion or Wankel.

However, other suitable catalytic materials will suggest themselves to those skilled in the art.

Figure 2:
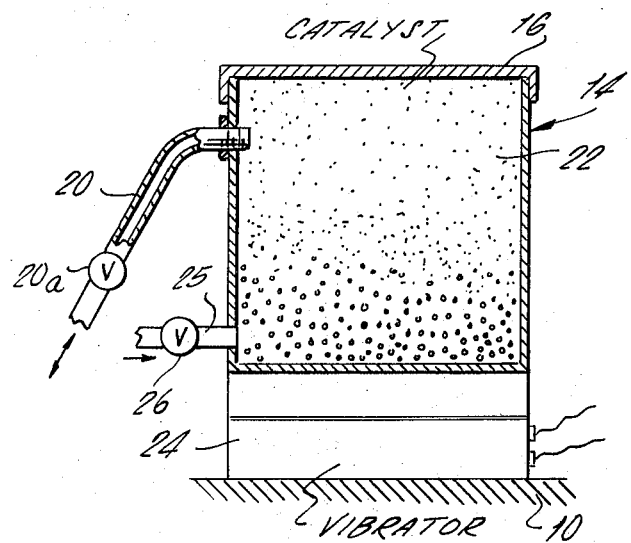
FIG. 2 is a vertical sectional view of a second embodiment of an exhaust purifier according to the present invention.

Referring to FIG. 2 there is shown a second embodiment of the present invention for use where it is not convenient to secure the container 14 to the engine 10. This embodiment is useful where the engine does not produce enough vibration to cause the formation of catalytic dust. In this form of the invention, a vibrator 24 is secured to the bottom 18 of the container 14. The precise nature of the vibrator forms no part of the present invention and may be selected from any one of the well-known motor driven, solenoid driven or other devices suitable for this purpose.

Since the container of FIG. 2 does not have to be attached to the engine it can be mounted within the vehicle with the tube 20 being led into the engine compartment. This type of mounting permits the use of transparent plastic material for the container 14 so that the quantity of catalyst within the container 14 may be checked frequently without opening the engine compartment or stopping the vehicle.

From the foregoing it will be seen that there has been provided a simplified, trouble-free exhaust purifier for internal combustion engines. The exhaust purifier is inexpensive and can be applied to new as well as in use engines with a minimum of difficulty. The rate of catalyst application is controlled by the performance of the engine without need for expensive sensing devices.

Having thus fully described the invention what is claimed and sought to be protected by letters patent is the following:

1. A purifier for the products of combustion coming from an engine comprising in combination with an engine having an exhaust manifold, a container, a quantity of catalytic material in dry form within the container, a first tube leading from the interior of the container to the interior of the exhaust manifold, a second tube in communication with the interior of the container, a source of gas under pressure connected to the second tube and means to vibrate the container to abrade the catalyst therein to form a fine dust of catalytic particles, whereby the catalytic particles in dust form will be drawn into and react with the products of combustion passing through the exhaust manifold.

2. A purifier according to claim 1 in which the first tube is led into the container at the upper portion thereof, the second tube is led into the container at the lower portion thereof and the means to vibrate the container includes a bracket secured to the container and the engine.

3. A purifier according to claim 1 in which a valve is incorporated in the first tube between the container and the engine manifold.

4. A purifier according to claim 1 in which the engine exhaust manifold includes a conduit into which all the products of combustion from a plurality of cylinders is led and the first tube is connected to the conduit in close proximity to the area where the conduit joins the exhaust manifold.

5. A purifier according to claim 3 in which the valve is a flap valve whereby the products of combustion coming from the engine cannot enter the container.

6. A purifier according to claim 5 in which a valve is incorporated in the second tube between the source of gas under pressure and the container.

7. A purifier according to claim 6 in which the source of gas under pressure is the exhaust manifold.

8. A purifier according to claim 1 in which the vibrating means includes a diaphragm in the bottom of the container.

9. A purifier according to claim 1 in which the vibrating means is a vibrator secured to the container.

10. The method of purifying the products of combustion coming from an engine comprising the steps of placing a quantity of a catalytic material within a container, vibrating the container to abrade the catalytic material to form a fine dust of said material, directing the said dust into the exhaust manifold of an engine in an area of maximum temperature of the products of combustion therein whereby the catalitic material reacts with the said products of combustion to render them non-toxic.

11. The method according to claim 10 in which gas under pressure is introduced into the container.

* * * * *